(12) United States Patent
Shinjo

(10) Patent No.: US 6,299,398 B1
(45) Date of Patent: Oct. 9, 2001

(54) BLIND RIVET

(75) Inventor: Katsumi Shinjo, Osaka (JP)

(73) Assignee: Yugenkaisha Shinjo Seisakusho, Osaka (JP)

( * ) Notice: Subject to any disclaimer, the term of this patent is extended or adjusted under 35 U.S.C. 154(b) by 0 days.

(21) Appl. No.: 09/583,525

(22) Filed: Jun. 1, 2000

(30) Foreign Application Priority Data

Jun. 1, 1999 (JP) .................................................. 11-153345

(51) Int. Cl.[7] ............................. F16B 13/04; F16B 13/06
(52) U.S. Cl. ................................... 411/43; 411/42; 411/70
(58) Field of Search ................................. 411/42, 43, 51, 411/53, 54, 54.1, 70

(56) References Cited

U.S. PATENT DOCUMENTS

| | | | |
|---|---|---|---|
| 3,515,028 | * | 6/1970 | Patton ................................. 411/42 X |
| 4,736,560 | * | 4/1988 | Murphy ............................... 411/43 X |
| 4,904,133 | * | 2/1990 | Wright ..................................... 411/43 |
| 4,909,687 | * | 3/1990 | Bradley et al. ......................... 411/43 |
| 4,969,785 | * | 11/1990 | Wright ..................................... 411/43 |

* cited by examiner

*Primary Examiner*—Neill Wilson
(74) *Attorney, Agent, or Firm*—Antonelli, Terry, Stout & Kraus, LLP

(57) ABSTRACT

A peel type blind rivet (1) has a rivet body (2) composed of a cylindrical part (3) and a flange-shaped head (4) formed integral with one end of the part, and a mandrel (5) composed of a body (6) for insertion in the part and an enlarged head (7) formed at one end of the body. Radial blades (9) are formed integral with a lower surface (8) of the mandrel head such that the other open end (14) of part (3) will be cut into radially protruding split feet (14a) when the mandrel body (4) is pulled back. The mandrel head (7) is of a maximum diameter (D) greater than an outer diameter (d) of the cylindrical part (3). The lower surface (8) increases its diameter gradually and upwards from the mandrel body (6) towards a rim (7a) of the mandrel head having the maximum diameter. Each blade (9) is of a V shape protruding downwards from the lower surface such that a cutting edge (10) of each blade extends upwards and obliquely from the mandrel body towards the rim. A circumcircle of outer ends (10a) of the cutting edges is of a diameter (d1) equal to or slightly greater than the outer diameter (d), so that the blades can surely and uniformly sever the rivet body open end so as to provide a reliable strong fastening force.

1 Claim, 4 Drawing Sheets

BLIND RIVET

BACKGROUND OF THE INVENTION

1. Field of the Invention

The present invention relates to a blind rivet, and more particularly to an improvement in the so-called 'peel' type blind rivet specially adapted for use to fasten a relatively soft article to a hard support or the like.

2. Prior Art

The blind rivet of the peel type is composed of a rivet body and a mandrel with a head, wherein radial blades are formed in and integral with the lower surface of this head. The rivet body comprises a cylindrical part that has at one of its opposite ends a flange-shaped head. In use, the mandrel inserted in the cylindrical part of the rivet body will be pulled strongly to such an extent that the blades cut deep into the other open end of said cylindrical part. A petal-shaped flare, that will thus be formed at that other end, consists of a plurality of severed feet protruding centrifugally so that these feet cooperate with the flange-shaped head to fasten a soft article onto a hard support (see for example the Japanese Laid-Open Patent No. 2-26305, ibid. 10-274220 and the Laid-Open Utility Model No. 5-36115).

In each of the prior art blind rivets of the described type, the mandrel head is of a diameter substantially equal to or slightly smaller than outer diameter of the cylindrical part of the rivet body. Therefore, effective cutting area defined as the diameter of a circumcircle surrounding the blades in the lower surface of mandrel head is noticeably smaller than said outer diameter of the cylindrical part. As a result, those blades are likely to fail to cut full thickness of peripheral wall at the open end of said cylindrical part. Thus, it has been difficult to cut the end wall into severed feet, and even if this were possible, those feet have tended to form a distorted or irregular flare at said end.

In the blind rivet disclosed in the Laid-Open Utility Model No. 5-36115, grooves are formed in the inner periphery of the rivet body's cylindrical part, at the open end thereof These grooves extending longitudinally of said part are weakened zones where the peripheral wall is rendered easy to break. However, such grooves are not only difficult to form, but also make it necessary for the mandrel's blades to be aligned with the respective grooves in the rivet body. Misalignment of the blades with the grooves will give rise to another problem that the cylindrical part's open end becomes more difficult to cut.

In the other prior art blind rivet shown in the Laid-Open Patent No. 2-26305, the peripheral wall of the open end is thinned for easier cutting with the blades. A petal-shaped flare, that may be formed in use in such a weakened region, will however probably fail to provide a sufficient fastening strength.

It is almost impossible to apply those prior art structures to blind rivets whose rivet bodies are made of an ordinary steel or a stainless steel, even if feasible for blind rivets of a much softer material such as aluminum alloys easy to cut.

SUMMARY OF THE INVENTION

An object of the present invention made in view of these inconveniences inherent in the prior art is therefore to provide a novel blind rivet of the peel type comprising a mandrel and a rivet body such that blades formed in a lower surface of a head of the mandrel can cut and expand centrifugally a cylindrical part of the rivet body at an open end thereof opposite to a flange-shaped head of said body, in a reliable and uniform manner without necessity of forming in an inner periphery of the open end such grooves as would be required in use to be set in alignment with the blades.

In order to achieve this object, a peel type blind rivet of the present invention comprises a rivet body composed of a cylindrical part and a flange-shaped head formed integral with one of opposite ends of said cylindrical part. The rivet further comprises a mandrel composed of a mandrel body and an enlarged mandrel head formed at one of opposite ends of the mandrel body that is shaped for insertion in the cylindrical part. A plurality of radial blades are formed in and integral with a lower surface of the enlarged head of the mandrel such that the other open end of the cylindrical part will be cut into radially protruding and petal-like split feet when the mandrel body is pulled in use of the blind rivet. The blind rivet of the invention is characterized in that the mandrel head is of a maximum diameter noticeably greater than an outer diameter of the rivet body's cylindrical part. The rivet is further characterized in that the mandrel head's lower surface increases its diameter gradually and upwards from an outer periphery of the mandrel body towards the mandrel head's rim having the maximum diameter. Each of the blades is of a V shape in cross section and protrudes downwards from the mandrel head's lower surface such that a cutting edge of each blade extends upwards and obliquely from the outer periphery of the mandrel body towards the mandrel head's rim having the maximum diameter. It is important to the blind rivet of the invention that a circumcircle of outer ends of the cutting edges is of a diameter substantially equal to or slightly greater than the outer diameter of the rivet body's cylindrical part.

Thus, the blind rivet provided herein does comprise those blades whose cutting edges have effective outer ends that define the circumcircle equal to or a little greater than the cylindrical part outer diameter of the rivet body. By virtue of this feature, those blade edges can fully act on the cylindrical part even to its outer peripheral face. This part's open end will surely be severed to form split feet that are then guided along the mandrel head lower surface increasing its diameter gradually and upwards so as to protrude radially and outwards to assume a petal-like shape.

THE PREFERRED EMBODIMENTS

Figure 1:
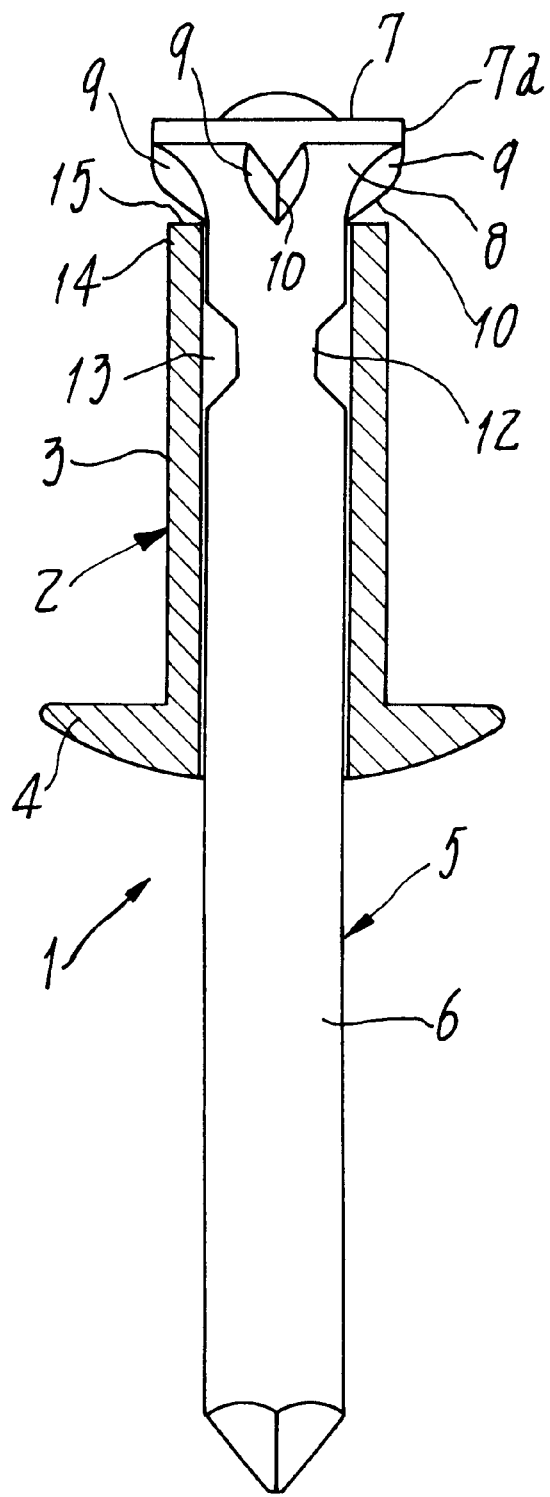
FIG. 1 is a front elevation of a blind rivet of the present invention, shown partly in cross section.

A preferred embodiment of the present invention will now be described, referring to the drawings.

In FIG. 1, a blind rivet of the invention is indicated generally at the reference numeral 1. This blind rivet 1 comprises a rivet body 2 whose cylindrical part 3 has an end formed as a flange-shaped head 4. A mandrel 5 so constituting the blind rivet has a mandrel body 6 whose one end is formed as an enlarged head 7. The mandrel body is inserted in the cylindrical part 3 of the rivet body 2, with both the mandrel 5 and rivet body 2 being made of a stainless steel.

Figure 2:
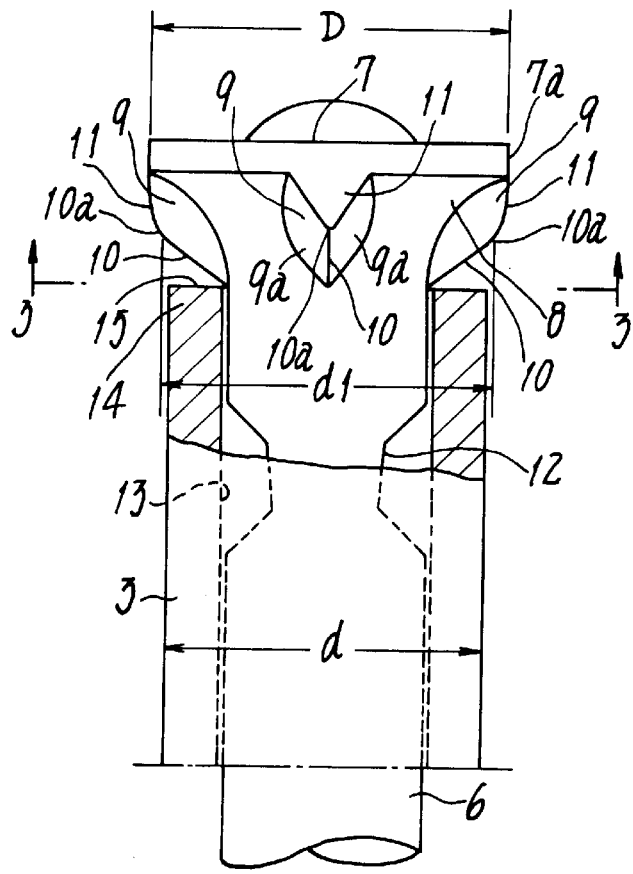
FIG. 2 is an enlarged cross section of a principal portion of the blind rivet shown in FIG. 1.
Figure 3:
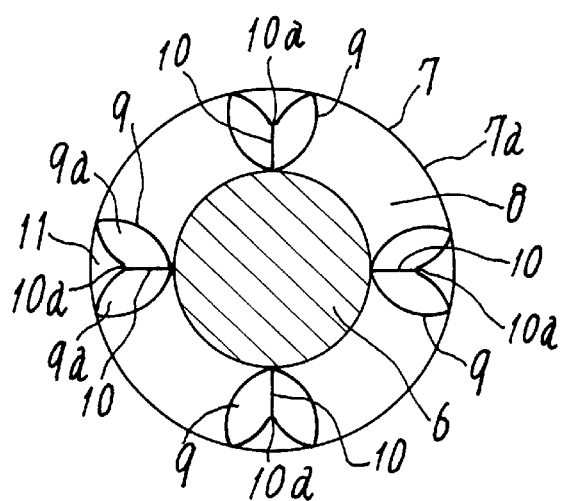
FIG. 3 is a cross section taken along the line 3—3 in FIG. 2.
Figure 4:
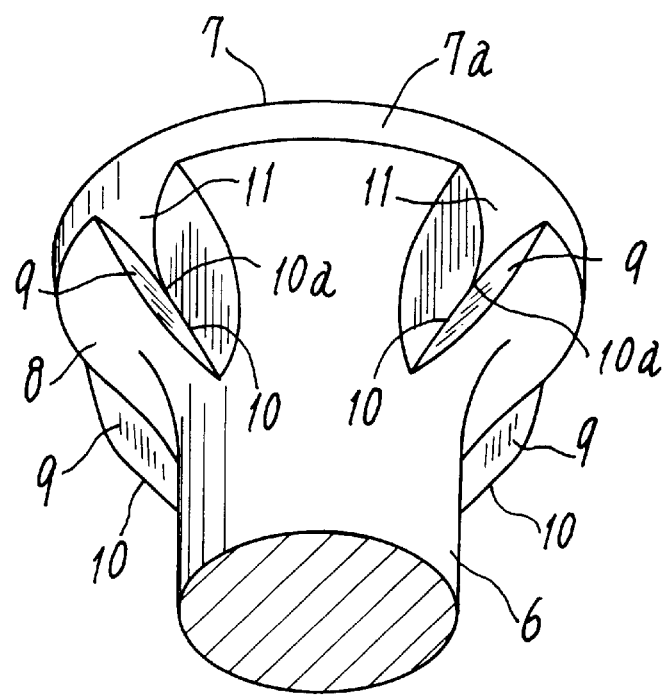
FIG. 4 is a perspective view of a mandrel that is included in the bind rivet.

As shown in FIG. 2, the mandrel head 7 has a maximum diameter 'D' that is noticeably larger than the outer diameter 'd' of the rivet body cylindrical part 3. A trumpet-shaped lower surface 8 of the mandrel head has a diameter gradually increasing from the outer periphery of the mandrel body 6 towards the head's rim 7a having the maximum diameter. Four radially-extending blades 9 protrude downwards from the lower surface of the trumpet-shaped lower surface 8. Each blade is of a V shape in cross section. A cutting edge 10 of each blade 9 is a ridgeline where facing slopes 9a merge one with another. Each cutting edge extends straight from the outer periphery of the mandrel body 6 towards the rim 7a having the maximum diameter 'D'. Outer ends 10a of those cutting edges 10 has a circumcircle whose diameter 'd1' is equal to or slightly greater than the outer diameter 'd' of cylindrical part 3 of the rivet body 2. The outer end 10a of each cutting edge is intervened between outer edges of the facing slopes 9a, so as to continue to a smooth convex surface 11 which in turn continues to the rim 7a of the maximum diameter 'D' (see FIG. 4). A neck 12 formed in the mandrel body 6 is located near the mandrel head 7 so as to be torn in use.

The cylindrical part 3 of the rivet body 2 has an axial bore 13 for receiving the mandrel body 6 inserted therein. As seen in FIGS. 1 and 2, the mandrel body will be put through the bore of cylindrical part 3, from an open end 14 (opposite to the other end where the flange-shaped head 4 is disposed). Thus, the mandrel 5 is combined with the rivet body 2 in such a state that the blades 9 on the lower surface 8 of mandrel head 8 takes a position adjacent to an end face 15 of the other open end 14.

Figure 5:
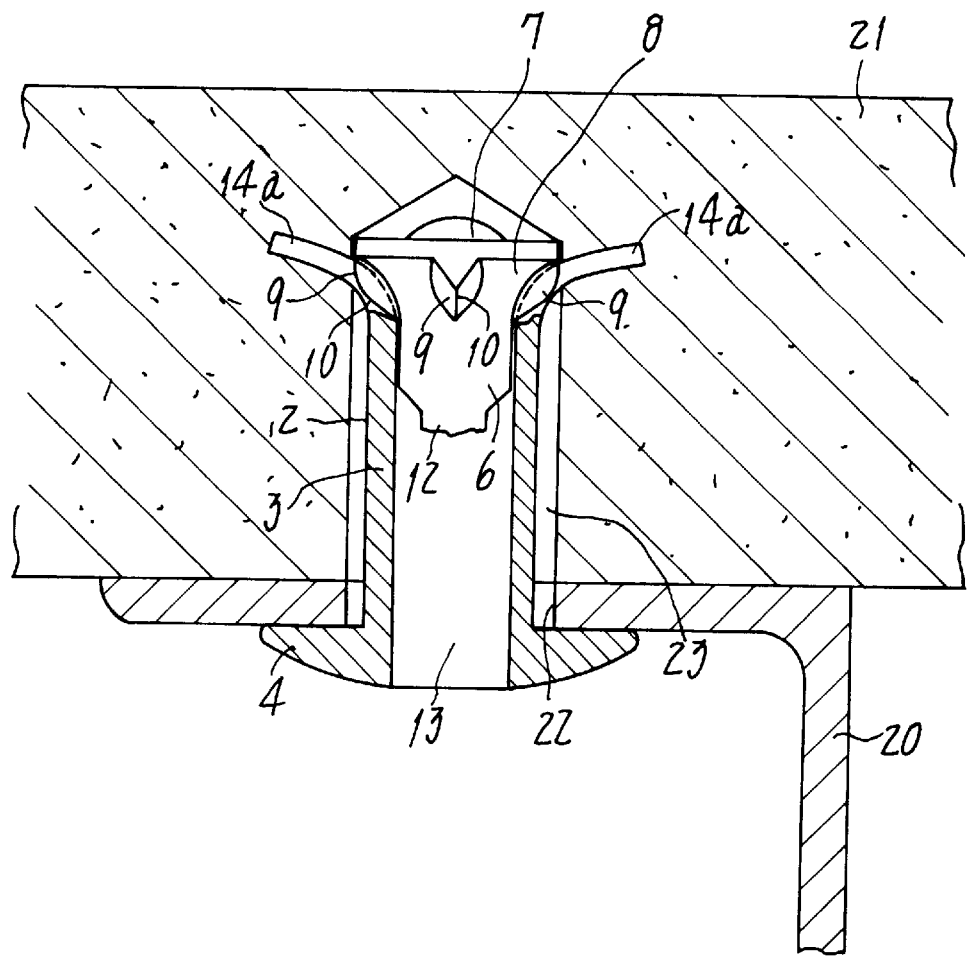
FIG. 5 is a cross-sectional front elevation of the blind rivet shown in use.

FIG. 5 illustrates the blind rivet 1 of the described structure in use to fixedly secure a relatively soft fireproof board 21 on a support 20. This support has a through-hole 22 in alignment with a bottomed hole 23 that is formed in the fireproof board 21. The rivet body's cylindrical part 3 will be put through the hole 22 and into the other hole 23, following the mandrel head 7, until the flange-shaped head 4 bears against the support 20. Subsequently, the mandrel body 6 will strongly be pulled back to force the blades 9 into the end face 15 of the open end 14 so that the blade edges 10 splits the open end 14 in several zones. Since the circumcircle diameter 'd1' of the outer ends 10a of cutting edges 10 is the same as or a little greater than the cylindrical part outer diameter 'd', these edges can fully cut into the cylindrical part 3 even to its outer periphery. The four cutting edges 10 will therefore split, without failure, the peripheral wall around the open end 14 into four widely opened discrete feet 14a. In this process, such four split feet 14a are pressed outwards by the slopes 9a of each blade 9 and also by the trumpet-shaped lower surface 8 of the mandrel head 7, so that they assume as a whole a set of petals extending out in radial direction and in the same fashion. In other words, those four petal-shaped feet 14a are forced sideways into the fireproof board 21 so as to cooperate with the flange-shaped head 4 to firmly fix said board to the support 20. Such a uniform and centrifugal wide expansion of the four petal-like split feet 14a assures a required strong fastening force, in every use of this blind rivet. Subsequent to this process, the mandrel body 6 will be pulled back more strongly to be torn at the neck 12, thereby leaving only a small portion adjoining the head 7 in the cylindrical part 3 of the rivet body.

The mandrel head 7 in the embodiment has the lower surface 8 trumpet-shaped, though the latter may be of a conical shape also increasing its diameter towards top.

It will now be apparent that the blades formed in the mandrel head lower surface are so designed that the peripheral wall portion around cylindrical part open end of the rivet body can surely and uniformly be split and opened sideways. A reliable fastening force of required strength will thus be obtained always, so that the present invention applies well to all types of blind rivets, whether their rivet bodies are made of any aluminum alloy or made of any ordinary or stainless steel.

What is claimed is:

1. A peel type blind rivet comprising:

a rivet body composed of a cylindrical part and a flange-shaped head formed integral with one of opposite ends of said cylindrical part, a mandrel composed of a mandrel body and an enlarged mandrel head formed at one of opposite ends of the mandrel body that is shaped for insertion in the cylindrical part, a plurality of radial blades are formed in and integral with a lower surface of the enlarged mandrel head such that the other open end of the cylindrical part is capable of being cut into radially protruding and petal-like split feet when the mandrel body is pulled in use of the blind rivet, wherein the mandrel head has at a rim thereof a maximum diameter (D) not less than an outer diameter (d) of the rivet body's cylindrical part, the mandrel head's lower surface increases its diameter gradually and upwards from an outer periphery of the mandrel body towards the rim having the maximum diameter, each of the blades is of a V shape in cross section and protrudes downwards from the mandrel head's lower surface such that a cutting edge of each blade extends upwards and obliquely from the outer periphery of the mandrel body towards the rim having the maximum diameter (D), so that a circumcircle enclosing outer ends of the cutting edges is of a diameter (d1) not less than the outer diameter (d) of the rivet body's cylindrical part, the maximum diameter (D) is noticeably greater than the outer diameter (d) of the rivet body's cylindrical part, and the diameter (d1) of the circumcircle is slightly greater than the outer diameter (d).

* * * * *